Nov. 20, 1934.   H. R. HAMLEY   1,981,646
MEANS FOR TEACHING MATHEMATICS AND EXHIBITING MATHEMATICAL PROBLEMS

Filed Nov. 10, 1930

Inventor
H. R. Hamley,
By Jed. B. Pitts,
Attorney

Patented Nov. 20, 1934

1,981,646

UNITED STATES PATENT OFFICE 1,981,646

MEANS FOR TEACHING MATHEMATICS AND EXHIBITING MATHEMATICAL PROBLEMS

Herbert R. Hamley, London, England, assignor to Lafayette Instruments Inc., New York, N. Y., a corporation of New York Application November 10, 1930, Serial No. 494,776

5 Claims. (Cl. 35—2)

The present invention relates to educational devices, and has for an object to provide a set of structural units adapted to be assembled into various figures of mathematical and geometrical design for use in demonstrating the relations between planes, lines and various configurations used in trigonometry, geometry and the like.

Another object of the present invention is to provide structural units of this character which have certain of the units of transparent or reticulated formation admitting of free inspection and viewing of intermediately disposed units to show various angular and intersecting relations between the intermediately and superposed units showing structurally the various mathematical configurations heretofore only graphically depicted.

The invention further aims at the provision of a set of structural units with coupling and securing means therefor defining vectors about which the plane units may be angularly adjusted and various supports for flexible cords and units embodied in the set and all of which may be used in various combinations and adjustments to produce structures simulating practically all mathematical problems to be demonstrated.

With the foregoing and other objects in view, the invention will be more fully described hereinafter, and will be more particularly pointed out in the claims appended hereto.

Figure 1:
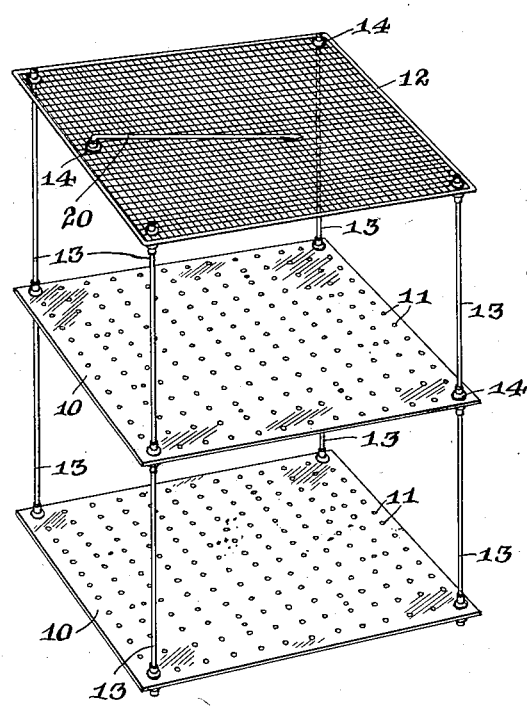
Figure 1 is a perspective view of a geometrical structure assembled with the units of this invention and showing an upper transparent plane with an angle indicating pointer mounted thereon.

Referring now to the drawing, 10 designates a plurality of solid plates which may be constructed of sheet metal or other suitable material and which may be rectangular or of other configuration and adapted to represent planes in the various geometrical figures which are adapted to be set up with the units of this invention.

Each plate 10 is preferably provided with rows of perforations or openings 11, and the rows of openings preferably extend in parallel relation to the lateral edges of the plate and with the openings spaced apart a predetermined distance to indicate units of measurement between the openings such as, one quarter inch apart, or an inch apart, to more accurately determine the relations between the plates and other units of the set which are used to make up the various figures desired.

The plates 10 may be of any desired or different color, and co-operating with the plates 10 are any desired number of plates 12, the latter being transparent and preferably constructed of wire meshing bounded by a suitable frame of heaver wire or cast metal. The transparent plates 12 are also adapted to indicate the planes in the various figures made up, and the wire meshing is adapted to be of predetermined size for the proper location and relation between the various units of the set and preferably the crossed wires making up the meshing of the plate 12 are spaced apart substantially a quarter of an inch, or an inch, according to the spacing of the openings 11 in the plate 10. The plates 10 and 12 may therefore be used simultaneously in a figure, such as shown in Figures 1 and 4.

Figure 3:
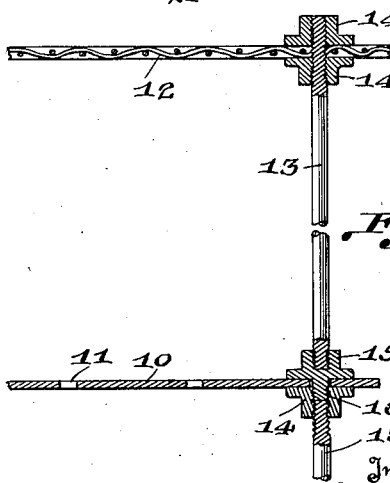
Figure 3 is a fragmentary enlarged view in section of a corner portion of the structure shown in Figures 1 and 4, showing the removable and adjustable connecting means for the plates.

The plates 10 and 12 are adapted to be secured in spaced apart and superposed relation, and for this purpose a number of vertical rods 13 may be used. Referring now more particularly to Figure 3, each rod 13 is preferably threaded upon opposite ends with one end adapted to project through an adjacent plate, such as 12, and is held in suitable position through one of the meshes thereof by a pair of clamping flanged nuts 14, one nut 14 being disposed against the underside of the plate 12 while the other nut 14 is mounted upon the rod 13 above the plate 12 so that the nuts 14 may clamp the plate securely between them and about the upper end of the rod 13.

The lower end of the rod 13 may be provided with a socket nut 15 which is provided with a seating or base flange adapted to engage the upper surface of the lower plate 10, and which is also provided with a threaded stud 16 which is preferably of sufficient length to extend through and beyond the plate 10 and to engage in another clamping nut 14 which is secured in binding engagement against the underside of the plate 10. The lower nut 14 is adapted to receive therein the upper end of a second vertical rod 13 when a desired number of the plates 10 and 12 are arranged as shown in Figures 1 and 4 in superposed spaced apart relation.

Figure 4:
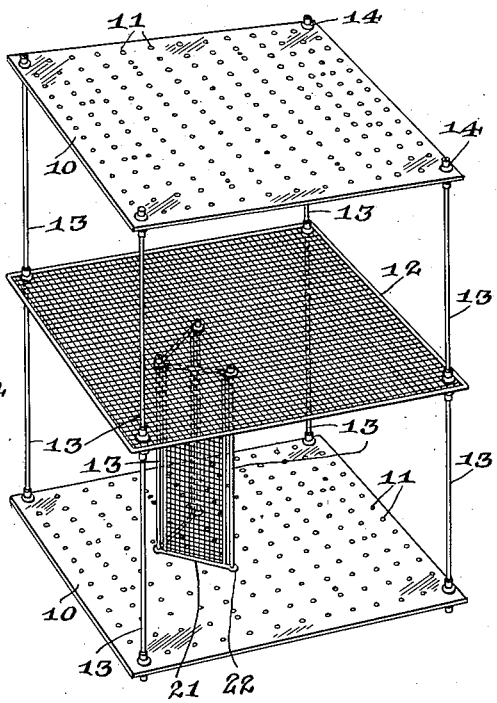
Figure 4 is a perspective view of the structural elements of Figure 1 arranged with the transparent plane intermediate the upper and lower planes and showing a pair of grid screens with their parts mounted in the structure to indicate relations between horizontal and verical angularly disposed planes.

It is thus evident that by using any desired number of the planes a figure may be built up with a number of spaces or compartments one above the other located between adjacent planes, and the transparent plane 12 may be mounted at the top of the figure, as shown in Figure 1, or may be interposed between adjacent planes 10, as shown in Figure 4, the transparent plate 12 being used in order that the intersecting or abutting lines or portions of the units of the set may be readily viewed and studied so as to visualize the angular relation between the various parts.

Figure 2:
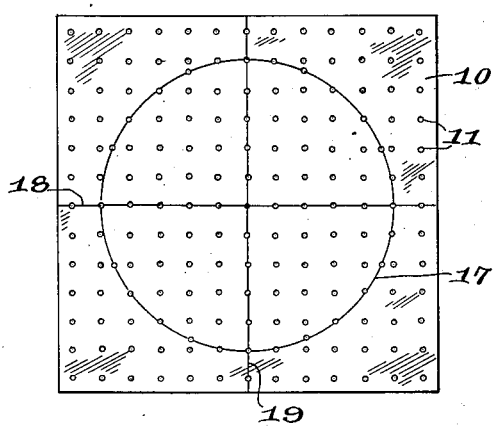
Figure 2 is a detail plan view of one side of one of the solid plane plates.

With special reference to Figure 3, it will be noted that one of the plates 10 may be provided upon its face with a circle 17 delineated in any suitable manner upon the surface and drawn in proportion to the location of the various openings 11. The plate 10 shown in Figure 2 may also be provided across its face with intersecting lines 18 and 19 indicating the horizontal and vertical axes of figures, defining quadrants, or otherwise indicating linear and angular relations between the plate 10 and various other units which may be assembled in relation thereto. It is also apparent that the plate 10 may be utilized for graphically illustrating various geometrical problems as the plate with its perforations 11 provides a base or background upon which graphs or the like may be imposed, the openings 11 giving the desired proportions.

In Figure 1, the transparent plate 12 is disposed at the top of the figure and mounted thereon is a pointer rod 20 which at one end is provided with a flat pointed head for determining correct positions of the outer end of the rod 20 while the inner end thereof is bent at right angles to provide an axis for passage through one of the openings in the plate 12 and is suitably threaded for the reception of a pair of clamping nuts 14, disposed one above and the other below the plate 12 for securing the rod 20 thereto and admitting of the turning of the rod by pressure thereon for swinging the pointer into various angles over the face of the plate 12. It is apparent that the pivotal end of the rod 20 may be removably mounted at any point throughout the area of the plate.

Referring now to Figure 4, it will be noted that the figure is provided with a pair of grid screens 21 which are of suitable configuration, comprising a frame of relatively heavy wire which supports a filler of screening or the like, and which has at its corners outstanding apertured ears 22. The ears 22 may comprise extensions of the end bars of the screens 21, the extensions being flattened and apertured to provide supports adapted to pivotally engage over the opposite end portions of the rods 13 as clearly shown in Figure 4.

As shown in Figure 4, one rod 13 may be utilized as an axis and secured in the bottom plate 10, while its upper end engages in an opening in the intermediate plate 12. A pair of the grid screens 21 is pivotally mounted upon the rod and adapted to be swung thereabout to various desired angles. The screens 21 may be held rigidly at the desired angle by other rods 13 engaging through the outer apertured ears 22 and which are also engaged in registering openings in the bottom plate 10 and the intermediate plate 12. The intermediate plate 12 is selected because it is transparent, or at least of such structure that there is substantially clear visibility therethrough so that the upper ends of the angularly disposed screens 21 may be observed where they come into contact with the bottom surface of the plate 12, thus clearly showing the angular relation between the plate 12 and the screens 21.

It is apparent that the various units comprising this set may be modified or changed, or may be used in any desired number, and may be given different colors so as to properly contra-distinguish various lines of form from those of division, and so as to adapt the set to practically all types and forms of figures which are used in mathematics for demonstrating problems and theorems which are not only hard to produce in drawing but very difficult to conceive from flat surface work.

What is claimed is:—

1. Means for teaching mathematics and exhibiting mathematical problems, comprising a plurality of plane plates having openings therethrough, rods disposed between said plates, means for adjustably connecting the rods at opposite ends to the plates in selected openings to dispose the plates in desired spaced apart and relatively angular relation, a rod disposed between certain of said plates, and plane frames pivotally mounted upon the said rod between said plates and adapted to be swung on the axis of the said rod to indicate various angular relations between the frames and the planes.

2. In a knock down structure means for teaching mathematics and exhibiting mathematical problems, comprising a plane plate having a plurality of openings therethrough, a rod for positioning at the side of the plate, a rod socket adapted to be adjustably mounted in selected openings of the plate and adapted to receive the end of the rod therein, and screw-threaded means for adjustably mounting the socket in a selected opening of the plate and holding the rod in predetermined position on the plate.

3. In a knock down structure a geometrical figure comprising a plane plate, a rod adjustably secured to the plate in desired angular relation thereto, and a pair of grid screens pivotally mounted upon said rod and arranged at desired angles relatively to one another for showing their relative positions with respect to said plane plate.

4. A knock down geometrical figure comprising a plane plate having openings therein spaced apart in predetermined order, posts, detachable means selectively engaging in the openings for supporting said posts, grid screens adjustably mounted on said posts and adapted to be swung into various angles with respect to one another, and removable means for holding said grid screens in angularly adjusted position with respect to each other.

5. In a knock down structure, means for teaching mathematics comprising a plurality of plates having a plurality of openings therethrough, rods disposed between said plates to space the latter apart, a socket member removably mounted in a selected opening in one of the plates and adapted to receive the end of a rod therein, said member also having a screw-threaded stud of sufficient length to extend through and beyond the plate, and a clamping nut received by said stud and adapted to have binding engagement with the side of the plate opposite to that which receives the socket member, said clamping nut being adapted to receive the end of a second rod.

HERBERT R. HAMLEY.